United States Patent [19]

Hagström

[11] Patent Number: 5,410,740

[45] Date of Patent: Apr. 25, 1995

[54] CONTROL OF A RADIO COMMUNICATIONS SYSTEM BASE STATION

[75] Inventor: Ulf E. Hagström, Taby, Sweden

[73] Assignee: Telefonaktiebolaget L M Ericsson, Stockholm, Sweden

[21] Appl. No.: 36,290

[22] Filed: Mar. 24, 1993

[51] Int. Cl.6 .............................................. H04B 7/01
[52] U.S. Cl. ....................................... 455/67.1; 455/9;
455/54.1; 455/226.1
[58] Field of Search .................... 455/54.1, 56.1, 67.1,
455/67.7, 127, 343, 226.1, 8, 9, 53.1, 103, 115;
371/66; 307/24, 34, 29, 39, 66, 87

[56] References Cited

U.S. PATENT DOCUMENTS

| 4,155,042 | 5/1979 | Permut et al. | 325/64 |
| 4,353,065 | 10/1982 | Mori | 340/825 |
| 4,392,225 | 7/1983 | Wortman . | |
| 4,435,840 | 3/1984 | Kojima et al. | 455/33 |
| 4,449,248 | 5/1984 | Leslie et al. | 455/38 |
| 4,794,649 | 12/1988 | Fujiwara | 455/9 |
| 4,819,180 | 4/1989 | Hedman et al. | 307/39 |
| 4,905,302 | 2/1990 | Childress et al. | 455/34 |
| 4,921,464 | 5/1990 | Ito et al. | 455/34 |
| 4,926,496 | 5/1990 | Cole et al. | 455/77 |
| 5,134,714 | 7/1992 | Janzen et al. . | |
| 5,289,524 | 2/1994 | Takano et al. | 455/54.1 |

FOREIGN PATENT DOCUMENTS 0466543 1/1992 European Pat. Off. .
404207931 7/1992 Japan .............................. 307/24

Primary Examiner—Reinhard J. Eisenzopf
Assistant Examiner—Thanh C. Le
Attorney, Agent, or Firm—Burns, Doane, Swecker & Mathis

[57] ABSTRACT

In a radio communications system having at least one base station, the base station including a plurality of transceivers, a control method and apparatus includes the steps of comparing the number of transceivers in a call state to a first predefined number. If the number of call state transceivers is greater than the first predefined number, then all of the idle transceivers except at least one are switched off. If the number of call state transceivers is less than the first predefined number, then all excess idle transceivers are switched off. Also, after switching off the first subset of the plurality of transceivers, a second subset may be switched off after waiting a predetermined time period. The number of operational transceivers in the second subset is less than in the first subset. To further reduce the power consumption of the base station, a first group of radio communications system subscribers is designated as a high priority group, and a second group of subscribers is designated as a low priority group. The system is designed to grant service to the high priority group, while denying it to the low priority group. The control methods and apparatus are useful, for example, for reducing power consumption and/or traffic handling capacity of a base station.

22 Claims, 2 Drawing Sheets

CONTROL OF A RADIO COMMUNICATIONS SYSTEM BASE STATION

BACKGROUND

The present invention relates to control of a radio communications system base station, and more particularly to a control method which reduces power consumption and traffic handling capacity in a radio communications system base station without harshly affecting ongoing calls within the cell served by the base station.

In a radio communications system having at least one base station (BS), such as in a cellular telephone system, the base station provides service to mobile units located within a predefined geographical area. Such base stations are expected to operate during power failures that generally affect the location of the base station. Consequently, there is a need to provide an alternative ("backup") source of power to a base station which will be utilized when the usual source of base station power has failed. Suitable backup sources of power may be batteries or in some circumstances, diesel-powered electric generators.

A base station site having, for example, 72 transceivers (typically, a base station site has between 10 and 100 transceivers), each transmitting 50 Watts (W) of power with a power efficiency of 25% requires $(50/0.25)*72=14400$ W of power to operate. Normally, a 24 volt system is used for radio base stations, so an exemplary electric current requirement for a base station during times of heavy loads would be $14400/24=600$ amp. Providing this amount of power during a failure of the main power supply requires a backup power supply to consist of many costly batteries or diesel-powered electric generators. Furthermore, accommodating the physical bulk of these backup power supplies may require that the base station plant floor be reinforced, and that the size of the base station plant be increased. Consequently, battery and plant costs commonly constitute the major investments for base station operators, and can even make it impossible to build some base station sites.

Thus, there is a need to provide a way for a base station to continue to operate during a power outage while at the same time reducing the cost and size of the backup power supply.

There are also circumstances other than failure of the main power supply, during which it would be advantageous to reduce the power consumption of the base station. For example, the overheating of equipment, or the occurrence of a fire could warrant reducing the base station power consumption. Similarly, there are circumstances when it is desirable to reduce the traffic handling capacity of the base station. During such transitions to reduced power consumption and/or reduced traffic handling capacity, it is still desirable to minimally affect ongoing communications traffic within the cell served by the base station. Thus, there is a need for a way to gradually reduce the power consumption and/or the traffic handling capacity of the base station in a way that reduces the disturbance to communications traffic capacity in the cell.

SUMMARY

It is therefore an object of the present invention to provide a method for reducing the power consumption of a base station while, at the same time, reducing the affect of the reduced power consumption on ongoing communications traffic within the cell served by the base station.

It is another object of the present invention to provide a method for reducing the traffic handling capacity of a base station while, at the same time, reducing the affect of the reduced traffic handling capacity on ongoing communications traffic within the cell served by the base station.

In accordance with one aspect of the present invention, the foregoing and other objects are achieved in a radio communications system having at least one base station, the base station including a plurality of transceivers. Each of the transceivers has alternatively, a call state and an idle state while switched on. A method and corresponding apparatus controls the base station, for example during a failure of the main power supply, by switching off a first subset of the plurality of transceivers so as to leave no more than a first predefined number of transceivers still operational. The first subset of transceivers requires less power to operate than the full plurality of transceivers, and thus reduces the output power requirements of the backup power supply. Traffic handling capacity of the base station is similarly affected. The method of switching off the first subset of transceivers includes comparing the number of transceivers currently handling calls (i.e., the "call state transceivers") to the first predefined number, and switching off all idle transceivers except at least one if the number of call state transceivers is greater than the first predefined number. On the other hand, if the number of call state transceivers is less than the first predefined number, then all excess idle transceivers are switched off, so as to leave switched on only a number of transceivers equal to the first predefined number.

In accordance with still another aspect of the invention, the system waits for a predetermined period of time after switching off the first subset of the plurality of transceivers, and then switches off a second subset of the plurality of transceivers so as to leave no more than a second predefined number of transceivers still switched on. In this case, the second predefined number is less than the first predefined number. This feature is useful, for example, to permit the base station to respond differently to power outages of short and long duration, in recognition of the fact that power outages of long duration must extend the life of the backup power supply by even further reducing power.

In yet another aspect of the invention, a first group of radio communications system subscribers is designated as a high priority group and a second group of radio communications system subscribers is designated as a low priority group. In accordance with this aspect of the invention, the high priority group is permitted to receive service from the first and second predefined numbers of still switched on transceivers, whereas the low priority group is refused this service. For example, the high priority group might consist of those subscribers making emergency calls. This reduction in load causes more transceivers to become idle, thereby consuming much less power. Traffic handling capacity is similarly reduced. Further power reductions can be achieved by switching off these idle transceivers, while at the same time leaving enough transceivers operational to provide essential service to the high priority group.

In a still further aspect of the invention, the base station is assigned a low priority which makes it a less likely candidate than other base stations having a higher priority assignment in the radio communications system for accepting a handoff call or an originating call. This low priority may be designed to cause the affected base station to only accept a handoff call if that call would otherwise not be picked up by any other base station in the radio communications system. This feature of the invention reduces the traffic handling capacity of the base station, and further reduces the load on the affected base station, which in turn permits more of the base station's transceivers to become idle, thereby consuming much less power. This feature may also be combined with above described methods of switching off idle transceivers to achieve further reductions of power consumption and traffic handling capacity in the base station.

BRIEF DESCRIPTION OF THE DRAWINGS

The objects and advantages of the invention will be understood by reading the following detailed description in conjunction with the drawings in which.

DETAILED DESCRIPTION

Figure 1:
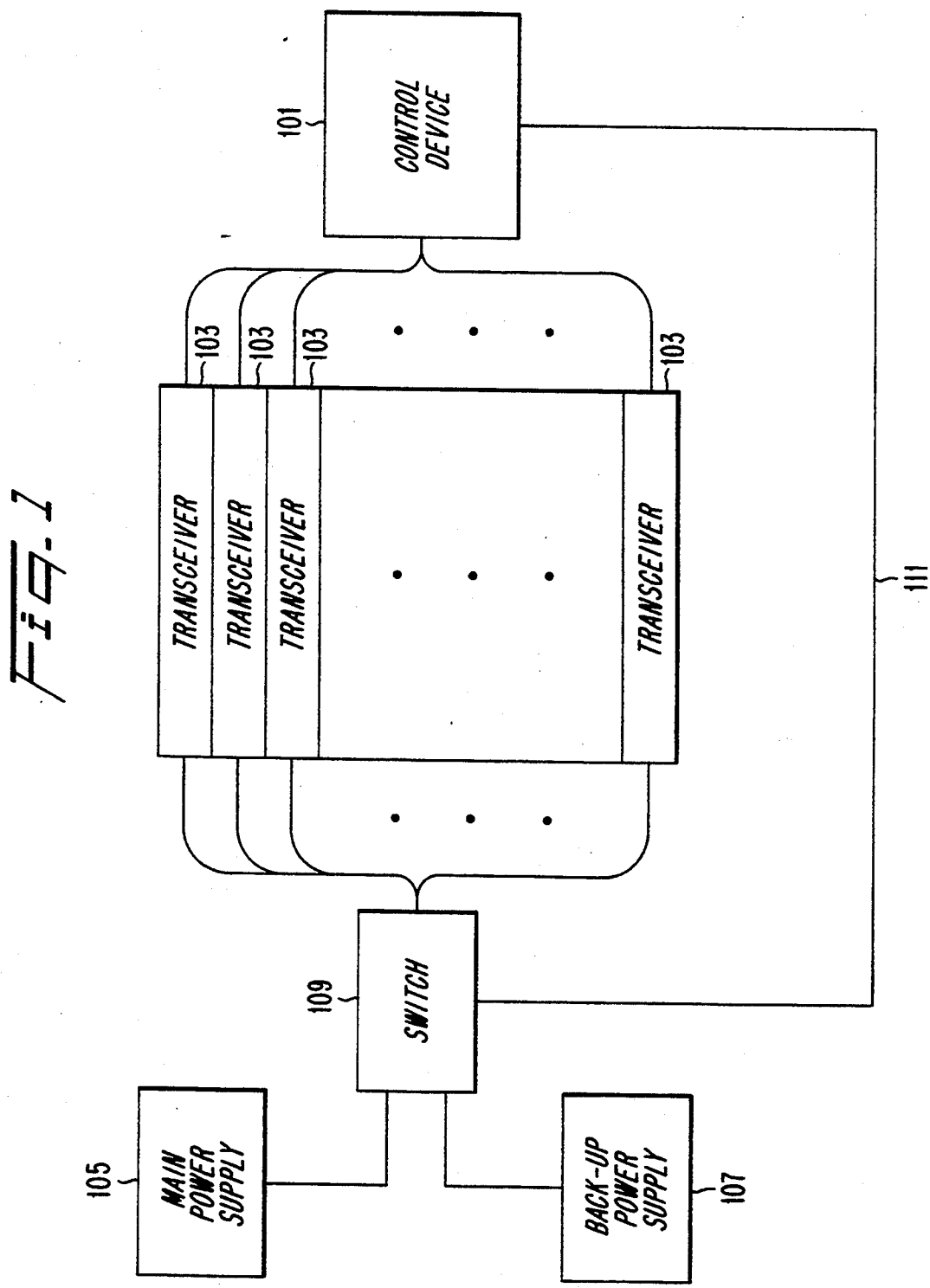
FIG. 1 is a block diagram of equipment in a radio communications system base station which functions in accordance with the present invention.

Referring to FIG. 1, a block diagram of a control device 101 is shown connected to each of a plurality of transceivers 103. Such transceivers may be capable of handling only one call at a time, or more than one call at a time. During normal operation, the transceivers 103 are powered by a main power supply 105 through a switching device 109. In the event that the supply of power from the main power supply 105 is disrupted, such as in a general power outage, the switch 109 will cause the transceivers 103 to be powered by the backup power supply 107, which may, for example, be one or more batteries or diesel-powered electric generators. A connection 111 between the switching device 109 and the control device 101 provides the control device 101 with a signal that is indicative of the disruption of power from the main power supply 105.

As described above, the amount of current drawn by the plurality of transceivers 103 during times of heavy load can be very large. However, for reasons of cost and size, it is desirable to reduce the power output requirements of the backup power supply 107. Therefore, in accordance with the present invention, the control device 101 controls the operation of the transceivers 103 so that their power input requirements will be reduced during periods of a power outage. This permits a smaller backup power supply 107 to be used.

In one embodiment of the present invention, the control device 101 reduces the total input current requirements of the transceivers 103 during a disruption in power from the main power supply 105 by shutting down a variable number of transceivers 103. That is, the transceiver 103 is either switched off, or else kept in a standby state which consumes a reduced amount of power. While in a standby state, a transceiver is turned on but forced by the system control to remain idle instead of actively handling a call. Although the greatest reduction in power consumption results from actually switching off the transceiver 103, a substantial power reduction can still be achieved by merely keeping the transceiver 103 in a standby state. A transceiver operating in a standby state has the additional benefit of being immediately available to take care of a call, compared to the warm up time that might be required to turn a switched off transceiver back on.

The strategy for selecting which subset of transceivers 103 are to be switched off (or kept idle) involves monitoring the activity of each transceiver 103. If a transceiver 103 has a call in progress, it is permitted to continue its receiving and transmitting operations. However, if a transceiver 103 is found not to be handling a call, the control device 101 switches that transceiver 103 off (or, in another embodiment of the invention, keeps that transceiver 103 in a standby mode). As it is usual for each transceiver 103 to be responsible for handling more than one channel in the communications system, a transceiver 103 is permitted to remain active so long as at least one of its channels has a call in progress. However, during this period of time, non-priority calls are preferably not allowed to be received by this or any transceiver 103 in the base station. Such calls are, instead, preferably handled by another base station that is not affected by the power outage. By dividing subscribers into priority groups as described, the system increases the likelihood that a transceiver 103 in the affected base station will become idle so that it can be switched off. In an alternative embodiment of this feature, only top priority calls are allowed to be received by transceivers 103 in the base station, but idle transceivers are not switched off. Instead, power consumption in the base station is reduced by the fact that more of the transceivers 103 are made idle. While idle, transceivers 103 require less power than while in the active state.

As explained above, when none of the channels in a transceiver 103 has a call in progress, the transceiver 103 may either be switched off, or alternatively be put into a standby state that draws less power. However, it may be advantageous to ensure that calls placed by high priority subscribers, such as emergency callers and the electric company, can still be handled by the base station, despite its being affected by the power outage. Consequently, in another preferred embodiment of the invention, the control device 101 ensures that a second transceiver 103 in the base station has at least one active free channel before turning off a first transceiver 103 which is not currently handling any calls.

In yet another embodiment of the invention, the number of transceivers 103 that are allowed to stay active is dynamically determined, in recognition of the fact that if a power outage is of short duration, even a reduced output backup power supply 107 may be capable of sustaining the operation of a number of transceivers 103. As the duration of the power outage increases, however, the number of active transceivers 103 must be further reduced to ensure that the backup power supply 107 will continue to provide power to a predetermined minimum number of active transceivers 103. Thus, in this embodiment of the invention, the control device 101 must monitor the duration of the power outage in addition to the current status of the transceivers in order to decide whether or not to turn off a particular transceiver or a set of transceivers.

Because the affected base station will be turning off transceivers 103, the possibility is raised that there will be a large number of simultaneous attempts by mobile units to switch over to neighboring cells. A limited call handling capacity of the system at this point can result in poor system performance. In order to avoid this "hazardous blocking," the process of decreasing the number of available channels must be handled smoothly. This may be done by dividing the subscribers into priority groups, such as was described above with respect to the two priority groups: high priority and non-priority calls. However, by defining a hierarchy of more than two priority groups, the control device 101 can cause the channels to be shut down more gradually. For example, several small groups of transceivers could be switched off at different times, such as after 5, 15, and 25 minutes, respectively. Such priority groups could be defined, for example, to provide access to emergency callers as long as there are any transceivers to use. In one embodiment, such emergency callers would be able to make transceivers available for access by terminating the calls being made by lower priority groups. Other priority groups could be given access according to a number of different rules. For example, transceiver access could be controlled by a timer, by means of a paradigm in which a lowest priority group is totally denied access to a cell with a power failure, a next higher priority group is permitted to have access only so long as the power loss has not lasted more than five minutes, a still higher priority group is denied access only after ten minutes of power failure, and so on.

Alternatively, a subscriber prioritization scheme could be defined so that a priority group is granted access only if there are at least two (or other number) voice paths (transceivers) available, a next lower priority group of subscribers is granted access only if there are at least four voice paths available, and so on.

In yet another embodiment of the invention, the number of active channels in the base station affected by the power outage may be smoothly reduced by having the communications system assign the affected base station a lower priority than that of adjacent base stations for accepting a handoff call or a new (originating) call. With this arrangement, calls requiting a handoff to another base station will be assigned to the adjacent base stations even if the signal quality of the affected base station is excellent. Similarly, new calls from mobiles traveling in the vicinity of the affected base station will be assigned to the adjacent base stations. Only calls that would otherwise be lost are allowed to be handled by the cell that is served by the affected base station. This feature may be used alone, or in conjunction with the features described above, in which idle transceivers are shut down. When used alone, base station power consumption is reduced because idle transceivers require less power than transceivers which are actively handling calls.

Figure 2:
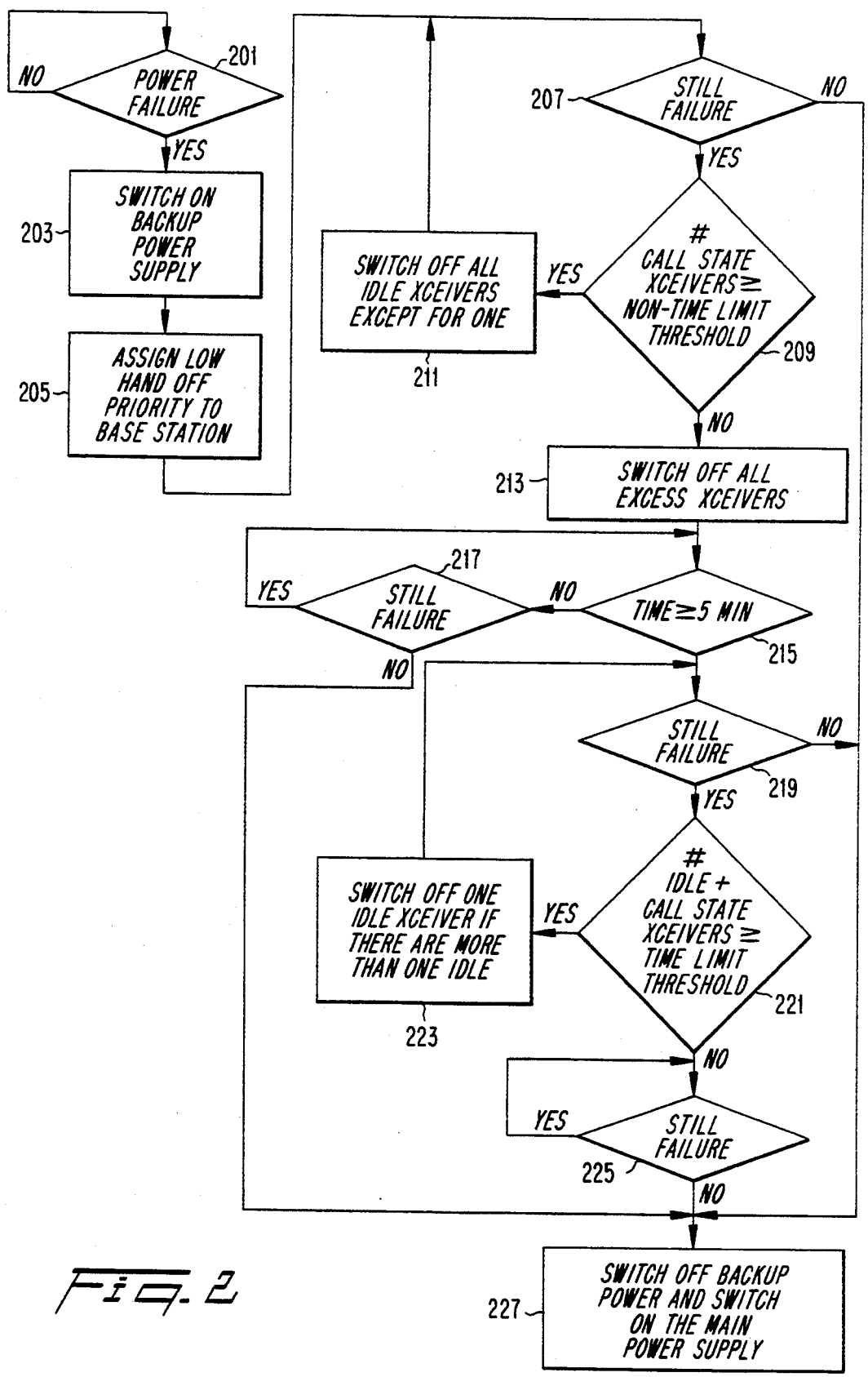
FIG. 2 is a flow chart showing the steps for reducing power consumption in a base station in accordance with one embodiment of the present invention.

A particular embodiment of the present invention incorporating the various features described above will now be described with reference to the flow chart of FIG. 2. Beginning at block 201, the control device 101 tests for the presence of a power failure. When one is detected, execution continues at block 203, where the backup power supply is switched on, so that the transceivers 103 will continue to receive power.

Next, at block 205, the base station experiencing the power outage is assigned a low handoff priority by the communications system. At the same time, the communications system may also give the affected base station a low priority for accepting originating calls. As described above, this will cause adjacent base stations to service new calls or calls requiring a handoff, except in those cases where the affected base station is the only one capable of providing service to this particular call. As previously described, this increases the likelihood of having transceivers 103 in the affected base station go into an idle state, in which power consumption is greatly reduced. When this feature is used in conjunction with steps which shut down idle transceivers 103, as further shown in FIG. 2, even more power consumption can be reduced.

Then, at block 207, the control device 101 tests to see whether there is still a power outage. If not, then block 227 is executed. At block 227, the backup power supply is switched off, and the main power supply is switched back on. In a preferred embodiment, the communications system assigns the base station a normal priority for accepting handoff and originating calls after being switched back on.

If the power outage continues, then execution proceeds from block 207 to block 209, where a test is performed to determine whether the number of transceivers currently servicing a call (the "call state transceivers") is greater than or equal to a non-time limit threshold. As explained above, if the power outage is of short duration, a larger number of transceivers 103 can be permitted to remain operational. The non-time limit threshold represents the target maximum number of switched on transceivers that can be powered at this time in order to conserve energy.

If the number of call state transceivers is greater than or equal to the non-time limit threshold, then at block 211, all of the idle transceivers except for one, are switched off. As explained above, it is advantageous to leave at least one idle transceiver operational so that it can service any incoming priority 1 call. The loop beginning at block 207 is then repeated. In the loop comprising blocks 207, 209, and 211, call state transceivers will eventually become idle transceivers as calls terminate. These idle transceivers, except for one, will be turned off in this loop until the number of switched on transceivers equals the non-time limit threshold plus one.

If the number of transceivers in a call state is less than the non-time limit threshold, then execution continues at block 213, where all excess transceivers are switched off, the number of excess transceivers being defined by the equation:

Excess transceivers = Total number of transceivers − Non-time limit threshold.

This will leave switched on, either in call state or in active state, a total number of receivers equal to the non-time limit threshold. Execution then continues at block 215.

At block 215, the control device 101 checks to see whether the duration of the power outage has reached a predefined limit. In the case of the example shown in FIG. 2, this limit is set to 5 minutes, but it will be readily understood by those skilled in the art that the limit could be set to an optimal value which depends on the type of backup power supply 107 being used, as well as the power input requirements of the transceivers 103. If the predefined time limit has not yet expired, then at block 217, the control device 101 determines whether the power outage continues. If not, then execution jumps to block 227, where the power from the main power supply 105 is restored, and the backup power supply 107 is switched off. If the power outage continues, however, then execution jumps back to block 215. The purpose of the loop comprising blocks 215 and 217 is to wait for either the power to be restored, or for the power outage to exceed the predefined time limit. During this time period, the number of switched on transceivers remains equal to the non-time limit threshold.

If the power outage does exceed the predefined limit, execution proceeds from block 215 to block 219, where another check is made to see whether the power outage continues. If it does not, then execution continues at block 227 which, as described above, causes the power from the main power supply 105 to be restored, the backup power supply 107 to be switched off, and the communications system assign a normal priority to the base station for accepting handoff and originating calls. If the power outage continues, then from block 219 execution continues at block 221.

At block 221, a test is performed to determine whether the total number of idle and call state transceivers is greater than or equal to a second threshold, called the time limit threshold. As previously explained, if the power outage lasts for a long time, then the control device 101 must extend the life of the backup power supply 107 by allowing even fewer transceivers to operate. Thus, the time limit threshold defines the maximum number of transceivers that can be permitted to operate under long term power outage conditions.

If, in block 221, it is determined that the time limit threshold has been exceeded, then at block 223, an idle transceiver 103 is switched off, so long as at least one idle transceiver 103 remains. Execution continues back at block 219, where the loop consisting of blocks 219, 221, and 223 may be repeated. It should be appreciated that if the total number of idle plus call state transceivers 103 is initially greater than the time limit threshold (which is the case when the non-time limit threshold is greater than the time limit threshold), then by turning off only one transceiver 103 during each pass of the loop, the loop will be repeated until the number of active plus idle transceivers 103 is one less than the time limit threshold.

As soon as the determination is made, in block 221, that the total number of idle and call state transceivers is less than the time limit threshold, then there is no longer any need to shut down any more transceivers. Consequently, execution continues at block 225 which effectively waits for the power outage to end. As soon as it does, then execution continues at block 227 so that the backup power supply 107 can be switched off, the main power supply 105 switched on, and the base station assigned a normal priority for accepting handoff and originating calls.

The invention has thus far been described in the context of reducing base station power consumption for the purpose of extending the life of the backup power supply 105. However, the methods described above produce a gradual reduction in base station power consumption, along with a reduction in communications traffic capacity, in a way which does not harshly affect ongoing calls within the cell served by the base station. For example, the described methods do not cause any ongoing call to be disconnected. Rather, such calls may terminate by themselves, or may be handed-off to adjacent cells. Thus, the present invention is also useful as a method for "softly" reducing the traffic capacity and power consumption of a base station at times other than during a failure of the main power supply 105. For example, this would be useful in the event of overheating of base station equipment, or in the event of a fire in the base station. The described methods are also useful for smoothly moving responsibility for ongoing calls from one base station to other adjacent base stations, so that maintenance work, which requires that equipment in the one particular base station be turned off, can be performed. Consequently, the methods of the present invention can be triggered to occur in response to a detection of such events. Similarly, the methods of the present invention may be initiated in response to a command that is manually issued by an operator, whenever the operator determines that a need exists for a reduction in base station power consumption and/or traffic handling capacity.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a radio communications system having at least one base station, the base station including a plurality of transceivers, each of the transceivers having, alternatively, a call state and an idle state while switched on, a method comprising the steps of:
   comparing a number of transceivers in the call state to a first predefined number, the first predefined number representing a number of transceivers to still be switched on after a first subset of the plurality of transceivers has been switched off;
   if the number of call state transceivers is greater than the first predefined number, then switching off all idle transceivers except at least one; and
   if the number of call state transceivers is less than the first predefined number, switching off a number of idle transceivers, so as to leave switched on only a number of transceivers equal to the first predefined number.

2. The method of claim 1, further comprising the steps of:
   after switching off the first subset of the plurality of transceivers, waiting a predetermined time period; and
   switching off a second subset of the plurality of transceivers so as to leave no more than a second predefined number of transceivers still switched on,
   wherein the second predefined number is less than the first predefined number.

3. The method of claim 2, wherein a first group of radio communications system subscribers is designated as a high priority group and a second group of radio communications system subscribers is designated as a low priority group, and wherein further the high priority group receives service from the first and second predefined numbers of still switched on transceivers, and the low priority group is refused service from the first and second predefined numbers of still switched on transceivers.

4. The method of claim 3, wherein the first group of radio communications system subscribers comprises a group making emergency calls.

5. The method of claim 1, wherein a first group of radio communications system subscribers is designated as a high priority group and a second group of radio communications system subscribers is designated as a low priority group, and wherein further the high priority group receives service from the first predefined number of still switched on transceivers, and the low priority group is refused service from the first predefined number of still switched on transceivers.

6. The method of claim 5, wherein the first group of radio communications system subscribers comprises a group making emergency calls.

7. The method of claim 1, further comprising the step of assigning a low priority to a base station, the low priority assignment causing the base station to be a less likely candidate for accepting a handoff call than other base stations in the radio communications system.

8. The method of claim 7, wherein the base station's low priority assignment permits it to accept a handoff call that would otherwise not be picked up by any other base station in the radio communications system.

9. The method of claim 7, wherein the base station's low priority assignment also causes the base station to be a less likely candidate for accepting an originating call than other base stations in the radio communications system.

10. The method of claim 9, wherein the base station's low priority assignment permits it to accept an originating call that would otherwise not be picked up by any other base station in the radio communications system.

11. The method of claim 10, wherein the step of comparing is performed in response to a failure of a main power supply of the base station.

12. In a radio communications system having at least one base station, the base station including a plurality of transceivers, each of the transceivers having, alternatively, a call state and an idle state while switched on, an apparatus comprising:
   means for comparing a number of transceivers in the call state to a first predefined number, the first predefined number representing a number of transceivers to still be switched on after a first subset of the plurality of transceivers has been switched off;
   means for switching off all idle transceivers except at least one in response to the number of call state transceivers being greater than the first predefined number; and
   means for switching off a number of idle transceivers, so as to leave switched on only a number of transceivers equal to the first predefined number, in response to the number of call state transceivers being less than the first predefined number.

13. The apparatus of claim 12, further comprising:
   means for waiting a predetermined time period after switching off the first subset of the plurality of transceivers, and then switching off a second subset of the plurality of transceivers so as to leave no more than a second predefined number of transceivers still switched on, wherein the second predefined number is less than the first predefined number.

14. The apparatus of claim 13, wherein:
   a first group of radio communications system subscribers is designated as a high priority group and a second group of radio communications system subscribers is designated as a low priority group; and
   further comprising means for allowing the high priority group to receive service from the first and second predefined numbers of still switched on transceivers, and for refusing, to the low priority group, service from the first and second predefined numbers of still switched on transceivers.

15. The apparatus of claim 14, wherein the first group of radio communications system subscribers comprises a group making emergency calls.

16. The apparatus of claim 12, wherein:
   a first group of radio communications system subscribers is designated as a high priority group and a second group of radio communications system subscribers is designated as a low priority group; and
   further comprising means for allowing the high priority group to receive service from the first predefined number of still switched on transceivers, and for refusing, to the low priority group, service from the first predefined number of still switched on transceivers.

17. The apparatus of claim 16, wherein the first group of radio communications system subscribers comprises a group making emergency calls.

18. The apparatus of claim 12, further comprising:
   means for assigning a low priority to a base station; and
   means, responsive to the low priority assignment, for causing the base station to be a less likely candidate for accepting a handoff call than other base stations in the radio communications system.

19. The apparatus of claim 18, wherein when the base station has a low priority assignment, the means for causing the base station to be a less likely candidate for accepting a handoff call permits the base station to accept a handoff call that would otherwise not be picked up by any other base station in the radio communications system.

20. The apparatus of claim 18, wherein the means for causing the base station to be a less likely candidate for accepting a handoff call is further responsive to the low priority assignment for causing the base station to be a less likely candidate for accepting an originating call than other base stations in the radio communications system.

21. The apparatus of claim 20, wherein when the base station has a low priority assignment, the means for causing the base station to be a less likely candidate for accepting a handoff call permits the base station to accept an originating call that would otherwise not be picked up by any other base station in the radio communications system.

22. The apparatus of claim 21, wherein the means for comparing is activated in response to a failure of a main power supply of the base station.

* * * * *